H. W. Hewet.
Button.

Nº 1889.    Patented Dec. 10. 1840.

Witnesses.
A. L. Amoureux
Rice Hadsell

Inventor.
Henry W. Hewet

UNITED STATES PATENT OFFICE.

HENRY W. HEWET, OF NEW YORK, N. Y., ASSIGNOR TO STEPHEN CLAPP, OF NEW YORK, N. Y.

MODE OF FASTENING BUTTONS.

Specification of Letters Patent No. 1,889, dated December 10, 1840.

*To all whom it may concern:*

Be it known that I, HENRY W. HEWET, of the city, county, and State of New York, have invented a new and Improved Mode of Fastening Buttons to Wearing-Apparel; and I do hereby declare that the following is a full and exact description.

The nature of my invention consists in providing a male and female screw for the purpose of fastening buttons to wearing apparel, &c., so that the buttons will be less liable to be pulled off than when fastened with a thread or rivet and can be taken off of one garment without being damaged and used upon others which could not be done if the button were riveted to the cloth; and they are more expeditiously fastened to garments and with much less trouble than buttons which are fastened by sewing or riveting.

To enable others skilled in the art to make and use my invention I will proceed to describe its construction and operation.

Figure 1:
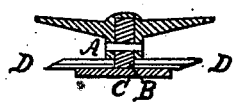
Figure 2:
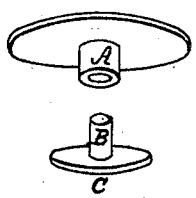

I construct my button heads in any of the known forms and to the back of which I attach a socket A, A Figures 1, 2, having a female screw for the purpose of receiving the male screw B, B, which has a flange C, C, said male screw is put through a perforation made in the stay and cloth D, D, of the wearing apparel and the button is screwed on to it so that the stay and cloth are kept between the flange and socket as represented in sectional view Fig. 1, and in order to prevent the button from unscrewing the male screw is provided with a longitudinal slot and the socket with a hole through its diameter and a suitable pin of wood is driven through the hole and slot after the button is screwed to its place as represented in sectional view Fig. 1, or a thread may be put through the hole and slot by means of a needle, as a substitute for a pin of wood.

Figure 3:
Figure 4:
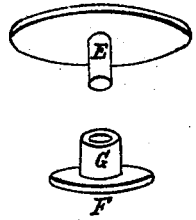

Another form in which the male and female screws are used to fasten buttons to clothes, &c., is the male screw is attached to the button head as E, E, Figs. 3, 4 and the socket G, G, with a female screw having a flange F, F, is passed through the stay and cloth H, H, and the button is screwed into it; as in sectional view Fig. 3, and in order to prevent the button from unscrewing a hole is drilled through the diameter of the socket and male screw in a right line with each other as in sectional view Fig. 2, and a wooden pin or thread is put through it as in the other arrangement of the screw.

I do not clam to be the inventor of attaching buttons to clothes &c. by means of a metal flanch having a stem passing through the button; as this has been patented but What I do claim as my invention and desire to secure by Letters Patent is—

The method of uniting the button and flanch by means of a male and female screw which are prevented from unscrewing by having a thread or pin of wood passed through them as herein described.

HENRY W. HEWET.

Witnesses:
GILBERT SHERER,
CHASE OSGOOD.